United States Patent [19]

Williames

[11] Patent Number: 5,131,215

[45] Date of Patent: Jul. 21, 1992

[54] TRACK SUPPORT FOR AGRICULTURAL MACHINES

[76] Inventor: Geoffrey A. Williames, Wills Street, Warragul, Victoria 3820, Australia

[21] Appl. No.: 571,663

[22] PCT Filed: Mar. 2, 1989

[86] PCT No.: PCT/AU89/00088

§ 371 Date: Oct. 30, 1990

§ 102(e) Date: Oct. 30, 1990

[87] PCT Pub. No.: WO89/08041

PCT Pub. Date: Sep. 8, 1989

[30] Foreign Application Priority Data

Mar. 2, 1988 [AU] Australia ................... PI7070
Sep. 29, 1988 [AU] Australia ................... PJ0682

[51] Int. Cl.$^5$ .................................................. F16G 1/08
[52] U.S. Cl. .................................. 56/27.5; 474/205; 474/268
[58] Field of Search ............... 474/268, 270, 271, 205; 264/167; 56/12.9, 13.1, 16.6, 27.5, 202, 203; 305/35 EB; 156/137

[56] References Cited

U.S. PATENT DOCUMENTS 3,582,154  6/1971  Russ ........................ 474/205 X
3,773,394  11/1973  Grawey ................... 156/137 X
4,846,771  7/1989  Kozachevsky et al. ....... 474/268

FOREIGN PATENT DOCUMENTS

0214538  9/1988  Japan ........................... 474/268

Primary Examiner—Thuy M. Bui
Attorney, Agent, or Firm—Learman & McCulloch

[57] ABSTRACT

An endless belt construction comprising a single endless belt composed of synthetic resin material molded integrally with a reinforcing member in a single length passed through the resin material in a plurality of adjacent loops, such loops being spaced from one another.

17 Claims, 9 Drawing Sheets

TRACK SUPPORT FOR AGRICULTURAL MACHINES

The present invention relates to endless belt constructions particularly for use in a track support system for agricultural and horticultural machines and the like. The invention also relates to a method of producing such endless belts and to the use of such belts in the support and transport mechanisms of agricultural and horticultural machinery.

The present invention has been developed for use in tea harvesting equipment, however it will be apparent that the inventive concepts disclosed herein are not limited to tea harvesting equipment alone. Many tea plantations have been established in relatively wet zones where the ground cannot satisfactorily withstand high loads. Moreover, tea plants are susceptible to roof damage from the passage of heavy agricultural machinery such as harvesting equipment. Often wheeled machinery, such as tractors and the like will become bogged or will damage plant roots and as a result their use in many tea plantations is difficult or impossible. As a result, there has been a need to provide light low cost machinery for use in tea plantations, particularly for harvesting tea. Endless track systems to support such machinery for movement through an agricultural growing area will of course distribute ground contact loads more evenly than wheels, however, conventional metal tracks, while being robust, are too heavy for use in most agricultural situations and certainly are too heavy for use in tea plantations. Endless track of this type have therefore, in the past, been produced using belts produced from moulded rubber with reinforcing members arranged therein, the belt being produced by cutting a desired length of reinforced rubber, boring the reinforcing material and overlaying the reinforcing material ends, and moulding and vulcanising rubber to join the ends of the belt around the overlapped ends of the reinforcing material. Commonly, metal track cleats were attached to these belts by drilling bolt holes through the belt and connecting the metal track cleats to the belt by appropriate bolts. These track constructions often failed prematurely at the join of the belt ends or alternatively at the bolt holes which often not only drilled through the rubber but also severed the reinforcing members.

The principal objective of the present invention is to provide a belt construction and a method of producing same that will provide a strong and durable belt for an endless track support system. A further preferred objective of the present invention is to provide a belt construction and a method of producing same that avoids the aforementioned problems of the known belt construction and method of producing same discussed above.

Accordingly, the present invention provides a belt construction comprising at least one reinforcing member in a single length of metal cable passed through the belt construction arranged in a plurality of loops, each said loop being arranged adjacent to but spaced from an adjacent said loop, and polyurethane moulded about said reinforcing member (or members) in a single piece to form said belt construction.

In accordance with a second aspect, the present invention also provides a method or producing an endless belt construction, said method of producing an endless belt construction, said method comprising providing a mould defining an endless belt shape, locating a plurality of members within said mould at spaced locations, said members forming part of said belt construction, each of said members defining location means for retaining an elongated reinforcing member in a desired position, locating an elongated reinforcing member within said mould in an arrangement of a plurality of loops held by said location means, said loops being adjacent to but spaced from one another, and introducing a mouldable synthetic resin into said mould to form said belt construction.

According to a still further aspect, the present invention provides a belt construction for use on a belt construction for use in a moving track support system of a vehicle, said belt construction comprising first and second endless lengths formed at least partially by moulded synthetic resin, said first and second endless lengths being laterally spaced from one another and each said endless length including at least one reinforcing member in a single length arranged within the synthetic resin in a plurality of loops, each of said loops being arranged adjacent to one another, and a plurality of metal cleats extending transversely across said first and second endless lengths on inwardly facing surfaces of said endless lengths, said metal cleats being connected to said endless lengths and uniformly spaced along said inwardly facing surfaces of the endless lengths of integrally moulded synthetic resin, each of said cleats including drive formations located intermediate transverse ends of said cleats adapted to cooperate with drive means of the track support system.

Preferably, the drive formations are located centrally between the endless lengths. Conveniently transversely spaced retainer members are provided, each said retainer member extending inwardly from said metal cleats to locate outwardly of support rollers of the track support system.

In one preferred embodiment, each said metal cleat includes at least one reinforcing member support element extending into the moulded synthetic resin at least in the first and second endless lengths, the or each said support element including a plurality of adjacent opening through which said reinforcing member or members pass. Preferably said first and second endless lengths are integrally moulded from said synthetic resin material with transversely extending outwardly directed traction bars of said synthetic resin material.

In a still further preferred embodiment, the first and second lengths are separately moulded with bores moulded into said lengths between adjacent said loops of the reinforcing member(s), said bores being located to enable bolts to secure said metal cleats to said endless lengths. Conveniently the metal cleats include transversely extending traction bars on outwardly directed faces of said endless lengths. Preferably the bolts that secure the metal cleats to said endless lengths also secure the traction bars and said retainer members to said endless lengths.

The drive formations on the metal cleats are conveniently inwardly facing convex curved surfaces adapted to co-operate with a sprocket wheel of the drive means of the track support system.

The present invention also anticipates providing a tea harvesting machine comprising a pair of laterally spaced, but aligned, moving track support means, each said moving track support means comprising a frame member, a plurality of roller support elements carried on the frame support member and an endless track configuration including a belt construction as described above, the belt construction being carried on said roller support elements. The tea harvesting machine may further include a main frame extending upwardly from each of said track support means to enable said machine to straddle at least one row of tea plants, a storage bin for harvested tea leaves supported on said main frame in a manner enabling pivoting movement of the storage bin from a harvesting position to a tipping position enabling discharge of tea leaves therefrom, tea leaf harvesting means being carried by said harvesting machine, vacuum inducing means adapted to create vacuum conditions within said storage bin, duct means associated with said bin leading from a position adjacent said harvesting means to said storage bin whereby vacuum conditions within said bin cause harvested tea leaves to flow through said duct means and be deposited in said bin.

Conveniently, the harvesting means is carried by said bin and is raised or lowered upon pivoting said bin. Preferably mechanical fixing means is provided to secure the harvesting means in a selected height relative to said harvesting machine. The main frame conveniently includes an upwardly extending section to which the bin is pivoted. Preferably a discharge door may be provided pivoted to the bin that opens automatically upon the bin pivoting to a tipping position.

Further preferred features and aspects of the present invention will become apparent from the following description given in relation to the accompanying drawings, in which.

Figure 1:
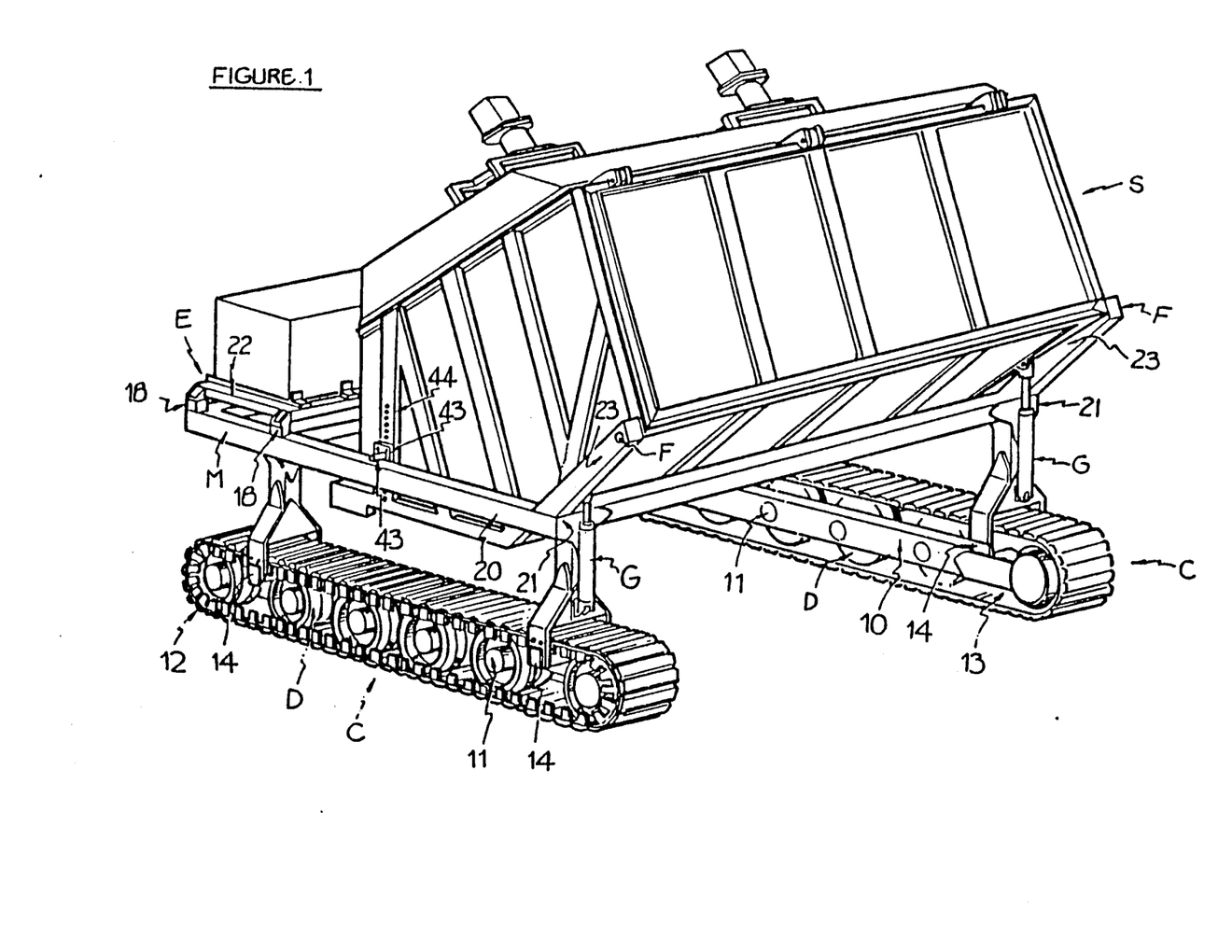
FIG. 1 is a rear perspective view of a tea harvesting machine produced in accordance with one preferred embodiment of the present invention.

Referring first to FIG. 1, the tea harvester machine comprises a pair of spaced moving track support means (C) with a main frame (M) supported therefrom and adapted to straddle at least one row of tea plants. A storage bin (S) is mounted in a pivoted manner from upstanding arms of the main frame (M) at pivot points (F). Lift cylinders (G) are provided to effect this pivoting movement. An auxiliary frame (E) is provided at the forward end of the main frame (M) and carries fuel tanks, hydraulic fluid storage tanks, power means such as a turbo-charged diesel engine driving hydraulic pump means to operate hydraulic motors and cylinders as hereinafter explained.

Each of the moving track support means (C) consists of:

(i) Undercarriage frame 10;
(ii) Idler wheel hubs and stub axles 11;
(iii) Track adjuster 12;
(iv) Final drive assembly 13; and
(v) Tractor main frame mounts 14.

The undercarriage frame (10) comprises a length of steel box section on which the idler wheel stub axles (11) may be welded. A final drive housing (13) may also be welded at one end of the frame (10). The tractor main frame mounts (14) may be welded to the frame (10) at spaced locations and the track adjuster (12) may be located at the end of the frame (10) opposite the final drive housing (13).

The idler wheel hubs (11) may be fitted with two tapered roller bearings of large capacity run in an oil bath. The sealing of bearings and oil is achieved by using a duo cone face seal, thus efficiently eliminating foreign matter from entering the hub and effectively stopping the escape of oil.

The final drive housing (13) welded onto the end of the undercarriage frame (10) houses a mounting plate for a planetary reduction power wheel and a hydraulic drive motor. A drive sprocket can be bolted onto the power wheel to facilitate easy removal and replacement if necessary.

Figure 9:
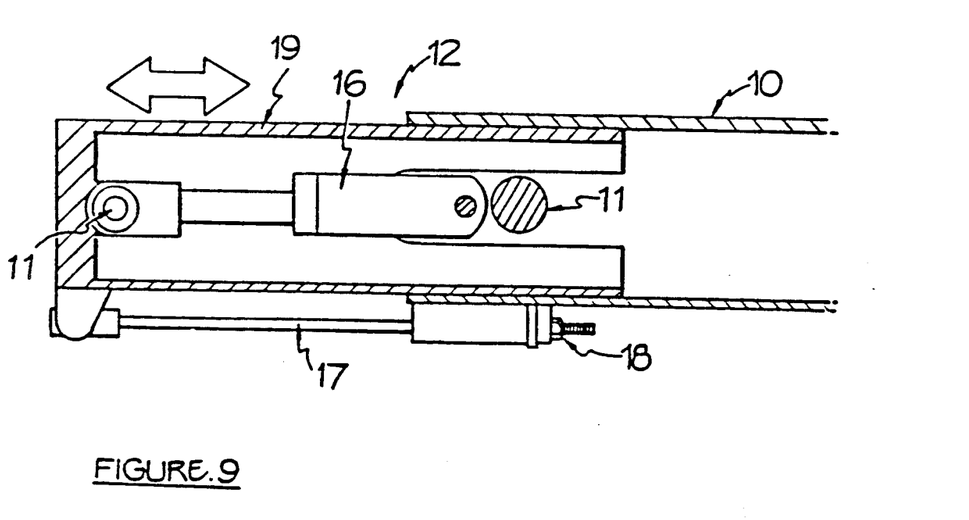
FIG. 9 is a longitudinal cross-sectional view of a nose region of the support bar for the track system shown in FIG. 1.

The track adjuster (12) (best seen in FIG. 9) slides into the front of the undercarriage frame (10). The track adjuster (12) comprises a member 19 that carries an idler wheel hub 11 at its outer end. The member 19 is pushed out (to tighten the track) or retracted to loosen the track by means of a cylinder (16). Hooked into the hydraulic circuit of the track adjuster cylinders (16) is a nitrogen charged accumulator which acts as a cushion forespring, so if any foreign object such as a rock etc. gets caught in the track and goes around either the front idler or rear sprocket, the accumulator takes the shock and allows the member 19 to move inwardly of the frame (10) to compensate for any strain on the track imposed by the rock. Also on the track adjuster (12) is a locator bar (17). After the track is tensioned correctly, the nuts (18) on adjuster bar (17) are tightened, so that if a rock were to get caught as aforesaid and the member 19 deflected inwardly, the track would automatically be restored to its correct tension.

As is further shown in FIG. 1 of the drawings, the main frame (M) consists of a square frame (20) gussetted at (21) to prevent any lateral movement caused for example by the machine being used in steep or undulating country. A fuel tank, an oil tank, and an oil cooler frame are fitted onto the auxiliary frame (E) formed by steel sections welded together to form a support frame (22). The support frame (22) has vibrator dampeners (18) fitted between the fuel/oil tanks frame (22) and the tractor main frame (M) to isolate any vibration. An engine, pumps and controller are also part of this assembly. At the rear of the main frame (M) are upstanding stand-off members (23) and the pivot points (F) for the tea harvester bulk tipping bin (S) are located at the upper and rear ends of the members (23).

Figure 8:
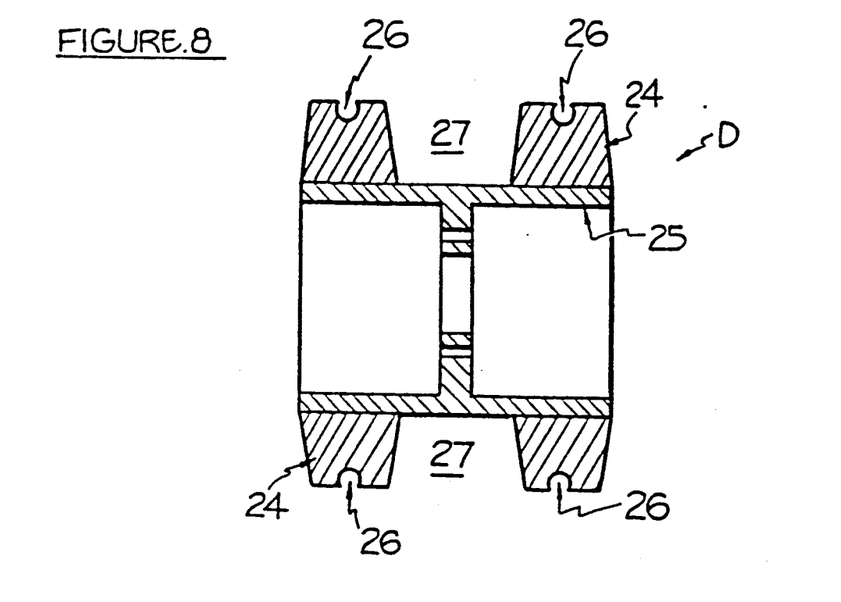
FIG. 8 is a cross-sectional view of a roller support wheel for use in the track system generally illustrated in FIG. 1.

FIG. 8 illustrates in sectional view a construction for the idler wheels (D) forming part of the moving track support (two being part of the track adjuster (12)). Each wheel has two polyurethane tires (24) on steel rims (25). The polyurethane tires have load slots (26) running the full circumference in the centre of each tire (24). These load slots (26) are intended to compensate for any displacement caused by excessive load or ordinary load. Moreover, the space (27) between the tires (24) also assists with displacement compensation.

The choice of polyurethane as the preferred material for the tires (24) has developed over a long research and development programme to fine the most desirable lightweight and durable material for wear and load bearing capacity. The tires (24) are preferably moulded onto the steel rims (25) and then the load slots (26) are machined.

Polyurethane has very high adhesion properties when poured into the mould, and when set and the mould removed, the tires are bonded securely to the steel rim (25), thus eliminating lifting away of tires from steel rims as evidenced when using rubber compounds and vulcanising onto sandblasted steel rims.

Figure 2:
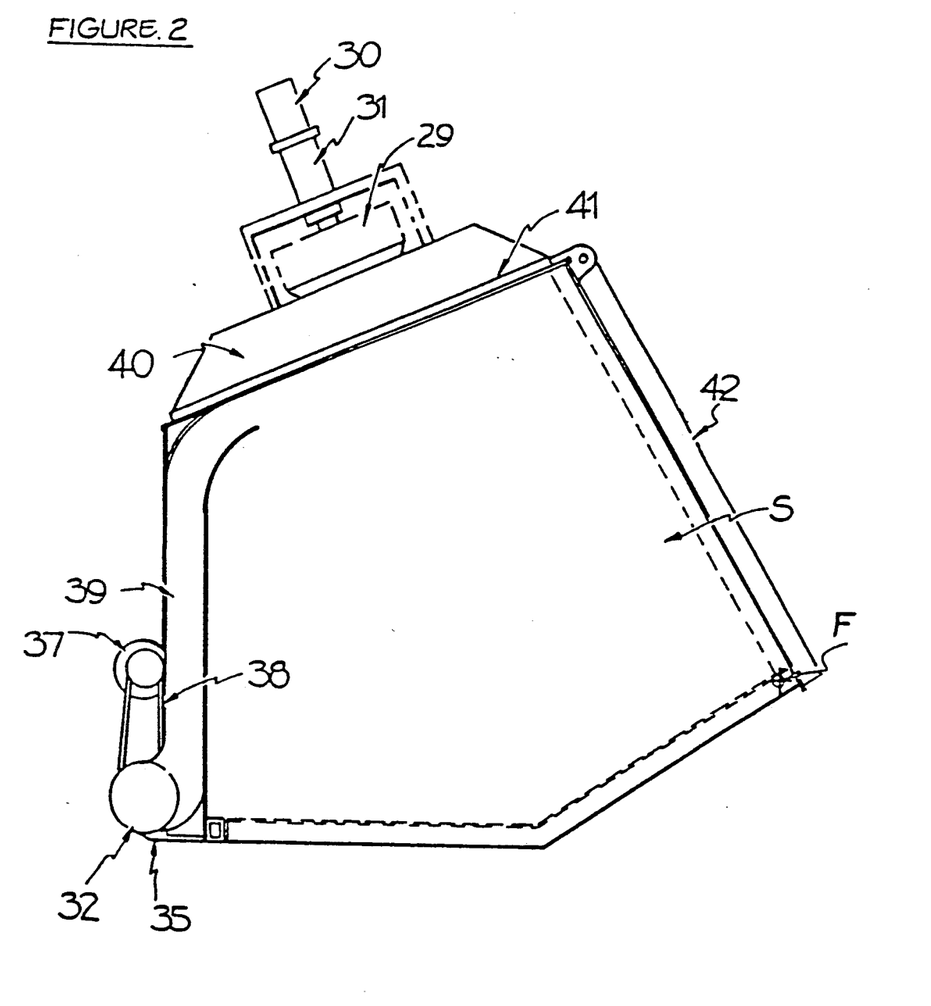
FIG. 2 is a longitudinal cross-sectional view showing schematically the cutting or harvesting mechanism and the storage bin for cut tea leaves.
Figure 3:
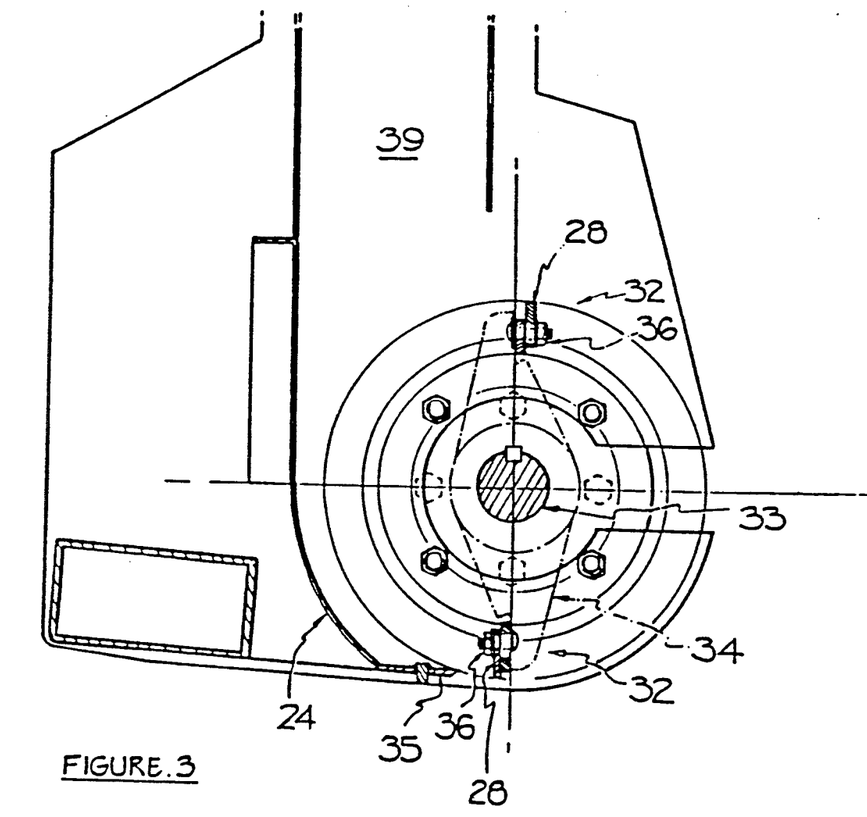
FIG. 3 is a cross-sectional view showing the cutting mechanism of FIG. 2.
Figure 3A:
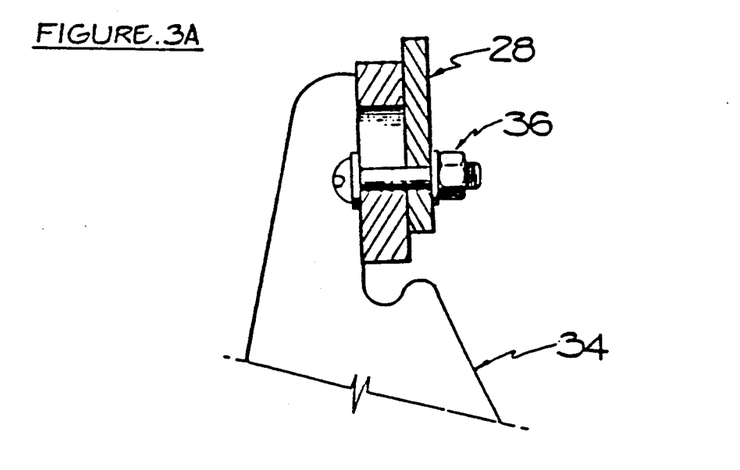
FIG. 3a is a detailed cross-sectional view illustrating a cutting blade of the cutting mechanism.

The tea harvesting arrangements of this machine are best illustrated in FIGS. 2, 3 and 3a of the accompanying drawings and comprise:
(a) Cutter bar;
(b) Suction chute;
(c) Bulk bin;
(d) Mesh screens; and
(e) Suction fans.

The principle of the tea harvester arrangement is a vacuum pick-up of cut leaf and vacuum transport from a cutting head to the bulk storage bin (S). The vacuum is effected by two large suction fans (29) situated on top of the bulk storage bin (S). The fans are hydraulically driven by appropriate hydraulic pumps and hydraulic motors (30) plugged into a drive shaft (31) of the suction fans (29).

The cutter bar (32) consists preferably of two or four blades (28) on a helix of 360 degrees over a full flight width. The cutter bar (32) comprises a central shaft (33) and a plurality of radially extending arms (34) supporting the blades (28) from the central shaft (33). The cutter bar (32) is easily removed by unbolting two-end flange bearings on each end of the bar (32) and a central split bearing, allowing for quick, easy replacement if any damage occurs to the blades (28) or shaft (33). The space between the shaft (33) and the actual cutter blades (28) is kept as maximum as possible as this gap greatly increases air flow velocity and consequent pick-up of cut leaf.

The cutter bar (32) is rotatably driven in association with a lower fixed blade (35) and are so designed so that the blades are self sharpening. The blades (28) on the rotating cutter bar (32) are adjusted by slackening of clamp bolts (36) and tapping down by a suitable instrument.

From the cutting head (which again is hydraulically driven by a motor), the cut leaf is transported up the vertical picking chute (39) and into the bulk storage bin (S). The top chamber (40) (above mesh screens (41)) is so designed that it is of the right volume for the correct air velocity reduction so that leaf falls into bin and is not sucked up against the mesh screens (41). The top section (40), including the fans (29), is removable so that screens are easily accessible for periodical checking and cleaning.

The bulk bin (S) is hinged high at pivot points F so as to allow maximum clearance under the bin when tipping. Tipping is achieved by the two hydraulic cylinders (G). The rear door (42) is so designed so as when the bin is returned to picking level, the door sits on the bin frame and is held shut by vacuum, thus eliminating the need for latches, clamps, or the like. Consequently, when the bin is full, the fans are shut down and vacuum ceases. Thereafter the bin tips, the door (42) is free to pivot about hinge points (45) and open under gravity to allow the leaf to be discharged into a waiting receptacle (e.g. trailers etc). The picking height is regulated and controlled by having adjustable stops (43) mounted on the side of bin. These stops can be removed and relocated anywhere on adjustable plate (44) adjustable stops set against tractor frame (see FIG. 1).

Figure 4:
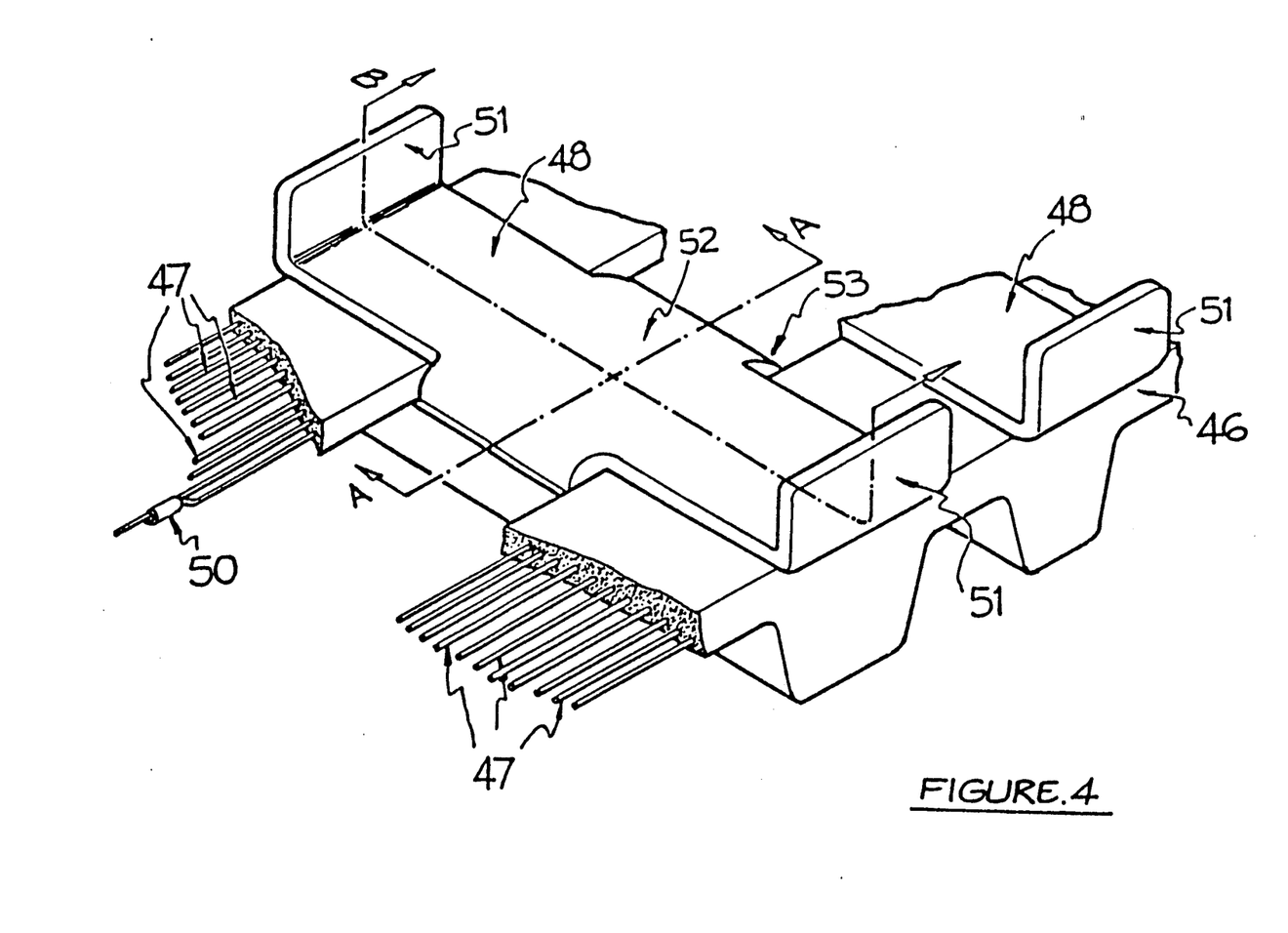
FIG. 4 is a partial perspective view of a first preferred embodiment of an endless track for use in a support mechanism of a tea harvester typically shown in FIG. 1.
Figure 5:
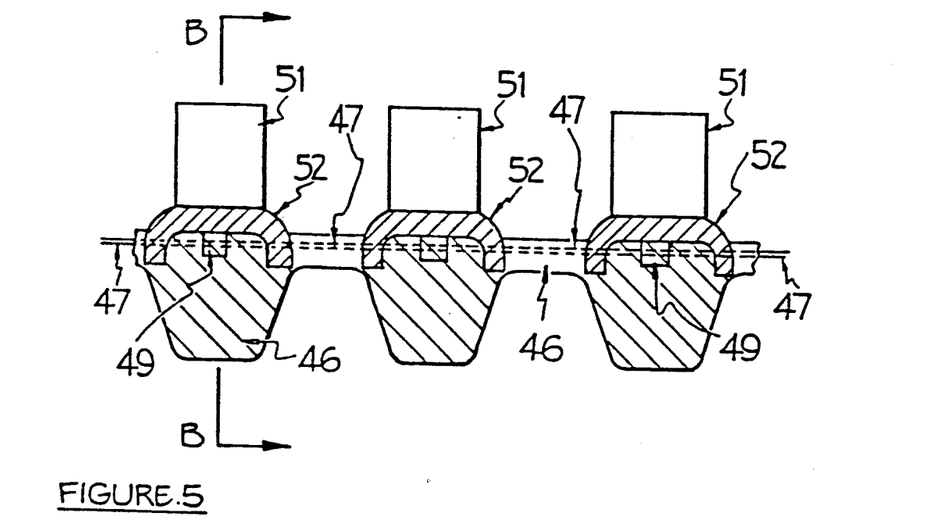
FIG. 5 is a cross-sectional view taken along lines A—A of FIGS. 4 and 6.
Figure 6:
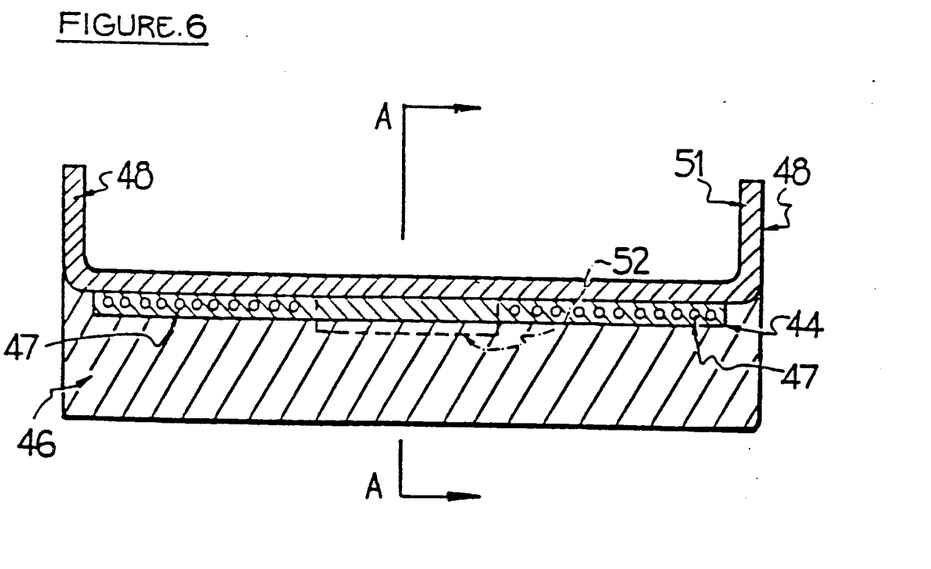
FIG. 6 is a cross-sectional view taken along lines B—B of FIGS. 4 and 5.

Reference will now be made to a first embodiment of the construction of the track in the moving track support system. This track construction is best seen in FIGS. 4, 5 and 6 and comprises:
1. A polyurethane track (46);
2. High-tensile galvanised steel cable (47);
3. Steel plates or cleats (incorporating retainers to stop tracks from running off idlers (48); and
4. Cable support bars (which also act as a cleat gusset to eliminate any bending of the cleats) (49).

The track (46) is preferably mounded from polyurethane into which the steel cables (47), track cleats (48) and cable support bars (49) are placed prior to the plastics material (polyurethane) being poured and moulding taking place.

Cable (47) is conveniently fed from a drum and passed through holes in the cable support bars (49) in one continuous run. The cables (47) may be crimped together by a suitable crimping means (50) at start and end of a run.

After the cables (47) have been accurately positioned in a mould, the plastics material is poured and moulding is completed.

The polyurethane is of such a durometer that it is extremely wear resistant. The bond of polyurethane to the steel cables is equal to the tensile strength of the polyurethane therefore ensuring a high strength high wear resistant continuous track.

The high tensile steel cable (47) (preferably 22 strands/track) is gal plated and so if a crack or some such defect does happen to occur in the polyurethane, the steel cable does not corrode and cause a weakness in the track itself.

The steel top cleats (48) including retainer sections (51) which stop the track from running off the idler wheels (D) is formed from a single piece of steel (high tensile steel) and incorporates a central formed curved section (52) in the centre to act as a sprocket drive.

The root of the drive sprocket of the final drive (13) drives on this curved section (52) and the spaces (53) between the cleats allows clearance for the sprocket teeth. The pitch of these cleats of course, matches the pitch of the drive sprocket. The dual tires (24) of the idler wheels (D) run each side of the sprocket slots and drive areas.

Figure 7:
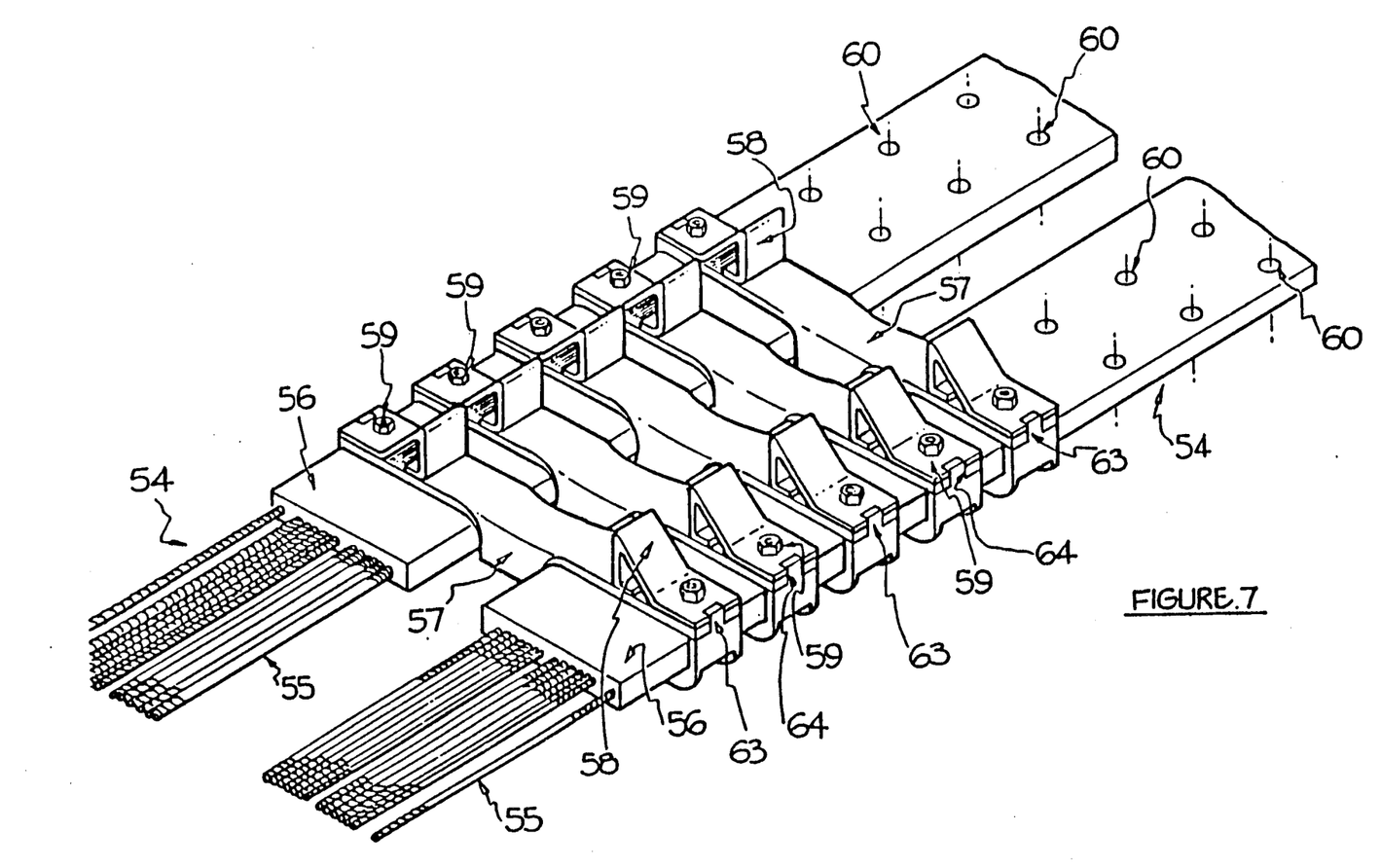
FIG. 7 is a partial perspective view of a second preferred embodiment of an endless track for use in a support mechanism of a tea harvester typically shown in FIG. 1.

Referring now to FIG. 7 of the accompanying drawings, a second preferred embodiment of an endless track for supporting an agricultural machine is shown. In this embodiment two endless belts (54) are provided. Each belt (54) has an elongated reinforcing member (55) arranged in a plurality of adjacent loops within a moulded polyurethane covering (56) of rectangular cross-section. Each belt (54) passes through a plurality of metal cleats (57) with upstanding brackets (58). Each of the belts (54) are secured to the cleats (57) and brackets (58) by two bolts (59) passing through bolt holes (60) in the belts.

As is illustrated in FIG. 7 each of the metal cleats is formed by a lower part (61) and an upper part (62). The lower part (61) provides tread bars transversely extending across the width of the track configuration for ground engagement. Additionally upstanding tabs (63) engage in notches (64) of the upper part to locate and provide greater strength in the assembly. Conveniently, the bolts (59) clamp and provide compressive forces against the polyurethane belt (56).

Figure 10:
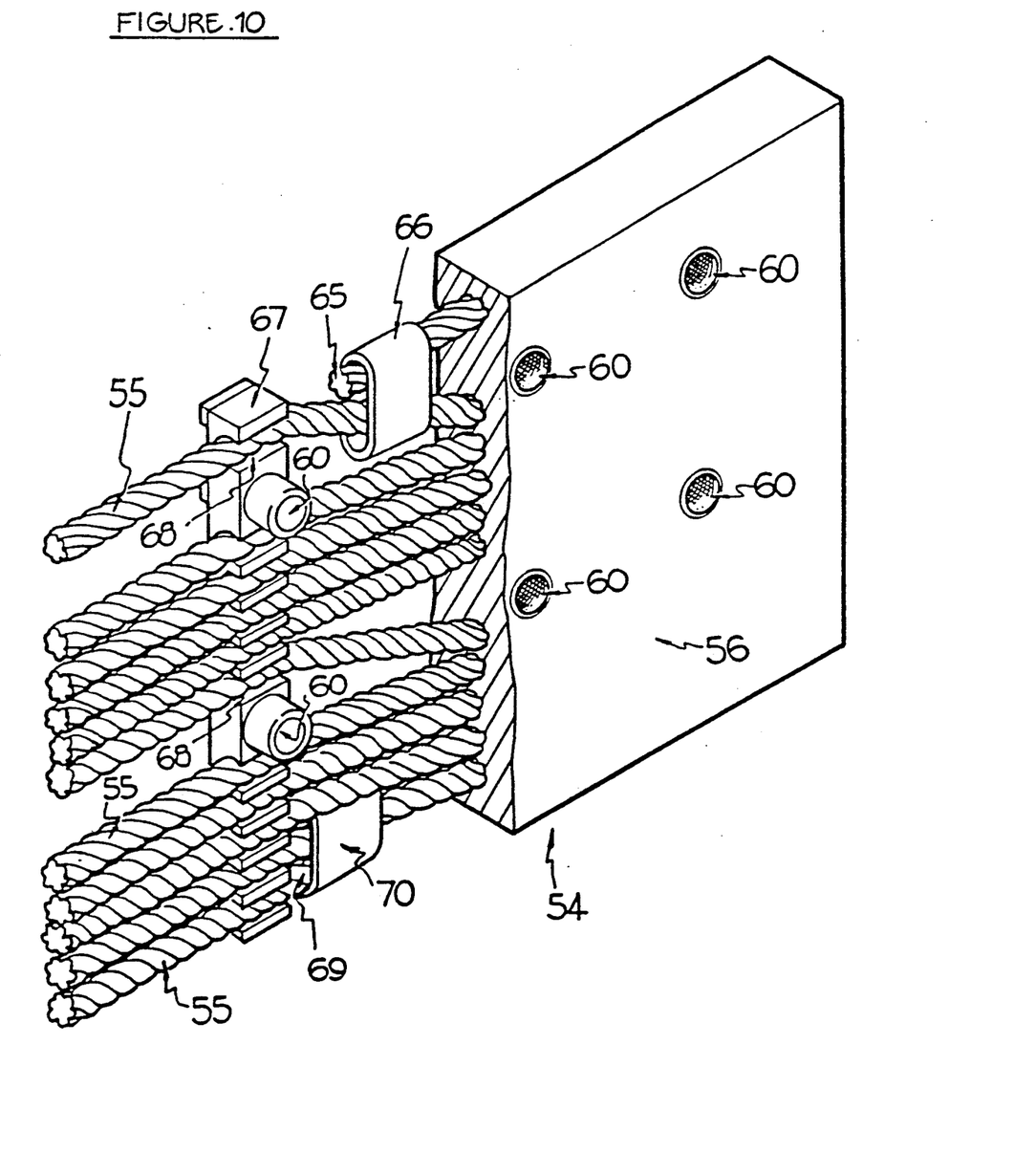
FIG. 10 is a partial and partially broken away perspective view of an endless belt produced from the mould arrangement shown in FIG. 11.

FIG. 10 shows the construction of each of the belts (56) in more detail. The reinforcing member (55) comprises a steel wire cable in a single length. One end (65) is crimped by an aluminium ferrule (66) or the like to a length of the cable. Thereafter, the length of cable (55) is wound in a plurality of loops on spacer members (67) (of moulded polyurethane) such that adjacent loops are spaced from one another. Each spacer member (67) includes a plurality of locating grooves (68) to appropriately locate the loops of the cable (55). Finally, the bolt hole apertures (60) are provided extending through the spacer members (67). The apertures (60) are of a length such that the surrounding material acts to form a depth guage for the polyurethane material moulded around the cable, that is, it acts to set the thickness of the belt. As is apparent, each bolt hole (60) formed through the belt is created by a spacer member (67). Finally, the end (69) of the cable (55) opposite the end (65) is joined by a ferrule (70) to the cable length (55) in a final loop. In this manner, a continuous reinforcing member is provided and the bolt holes (60) are achieved without harming the reinforcing member (55).

Figure 11:
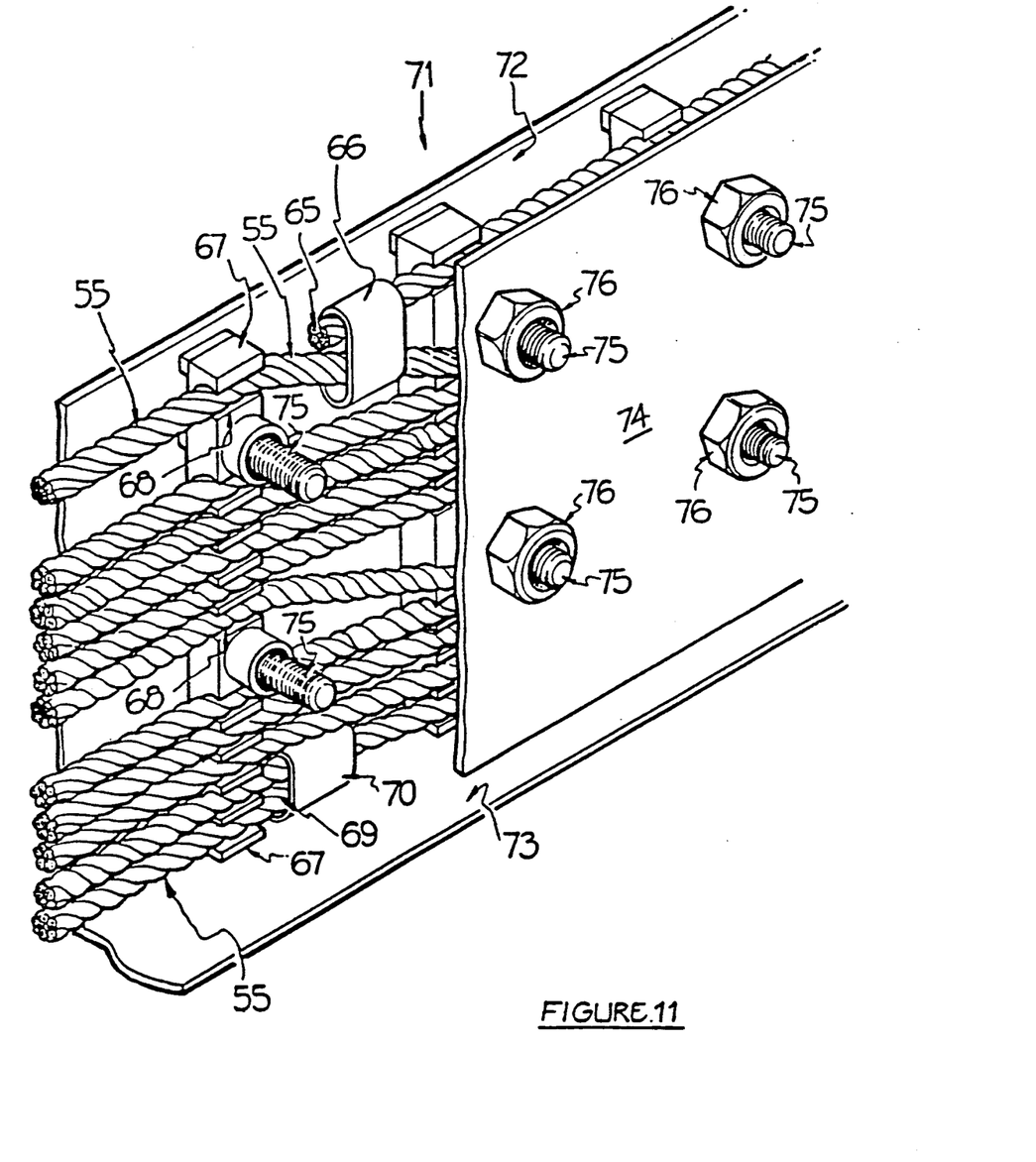
FIG. 11 is a partial perspective of moulding apparatus for use in the method of the present invention.

Reference will now be made to FIG. 11. The belts (54) are conveniently produced within a mould (71) having a main inner wall (72) of circular configuration with a lower mould wall (73) and outer wall (74). Conveniently, the inner wall (72) and lower wall (73) are essentially annular and are mounted for rotation about a central axis. A plurality of bolts (75) extend through the inner wall (73) to enable nuts (76) to connect the outer wall (74) to the inner wall while defining the desired moulding gap defined by the length of the thickness of the spacer member (67) about the holes (60).

In a moulding process, the spacers (67) are located on the bolts (75) and thereafter the cable (55) is wound onto the spacers (67). Thereafter, the outer wall (74) is fixed by the nuts (76) with the outer wall (74) being tightened against the spacers (67). The mould is rotatable to assist in feeding of the wire cable onto the mould. Once this has been completed, polyurethane is introduced into the mould.

It is generally important to achieve a good bond between the polyurethane and the wire cable. To achieve this, it has been found necessary to provide a clean new metal surface which is subjected to appropriate chemical pretreatment. This has been achieved by starting with galvanised wire cable with the galvanising coating being removed immediately before use. The wire cable then being passed through baths of a degreaser (toluene) and a bonding agent (chemlock) prior to being wound onto the mould.

One currently preferred process will hereinafter be specifically described. The method of manufacture is conveniently performed in two stages:

1. Cable support manufacture.
2. Track belt manufacture.

Cable Support Manufacture:

Step 1
(a) Clean moulds;
(b) Apply release agent.

Step 2
Preheat mould to 100 degrees centrigrade in oven.

Step 3
Prepare chemicals:
(a) 800 grams of L167A (95 durometer) prepolymer is preheated to 100 degrees centrigrade.
(b) At this point the prepolymer is placed in a degassing unit and held at a vacuum of −95 m.p.a. for 5 minutes.
(c) 100 grams of bisamine A (curative) is preheated to 100 degrees centrigrade.
(d) After degassing the prepolymer is removed from the degasser and heat applied to maintain 100 degrees centrigrade.

Step 4
The mould is removed from the oven.

Step 5
100 grams of bisamine A is added to the prepolymer and mixed for one minute.

Step 6
The mixture is poured into a syringe and injected into the cable support moulds.

Step 7
When all the moulds are full, they are placed in the oven for one hour of curing at 100 degrees centigrade.

Step 8
At this point the cable supports can be removed from the mould and the process repeated.

BELT MANUFACTURE:

Step 1
Prepare mould-(a) clean. (b) apply release agent.

Step 2
Degrease cable supports with toluene.

Step 3
Apply bonding agent (chemlock 210FE) to cable supports by brush.

Step 4
Load cable supports into mould (Refer FIG. 4).

Step 5
Load 86 meters of cable onto drum.

Step 6
Degalvanise cable in phosphoric acid for 5 to 10 minutes.

Step 7
Rinse cable in water for 30 minutes making sure to agitate at regular intervals.

Step 8
Dry cable in oven for 30 minutes.

Step 9
Load cable drum onto dispenser (Refer FIG. 5).

Step 10
Feed cable through
(a) Degreaser (toluene).
(b) Bonding agent (chemlock 210FE)
(c) Feed two aluminium ferrules onto the cable.

Step 11
Clamp cable to mould and feed cable onto cable supports making one revolution. Note: important to keep feeding aluminium ferrules along cable and checking that cable is seated securely in cable supports.

Step 12

Take one of the aluminium ferrules and feed the end of the cable through it and crimp.

Step 13

Continue to feed cable onto cable supports making sure the cable is seated firmly in the cable supports. After completing 10 revolutions leave the second aluminium ferrule between the same cable supports as the first aluminium ferrule (Refer FIG. 2). Continue to feed cable onto cable supports for one revolution.

Step 14

After one revolution cut cable to length and feed end through second ferrule and crimp.

Step 15

Fit outer ring to mould (Refer FIG. 4).

Step 16

Preheat mould to 100 degrees centigrade.

Step 17

Prepare chemicals.
  (a) 22,000 grams of L100A (90 durometer) prepolymer is preheated to 100 degrees centigrade.
  (b) At this point the prepolymer is placed in degassing unit and held at a vacuum of −95 m.p.a. for 20 minutes.
  (c) 3,000 grams of bisamine A (curitative) is preheated to 100 degrees centigrade.
  (d) After degassing the prepolymer is removed from the degasser and heat applied to maintain 100 degrees centigrade. This temperature is thermostatically controlled.

Step 18

The oven is lifted off the mould.

Step 19

3,000 grams of prepolymer is measured into a bucket. 30 grams of colouring is added. 375 grams of bisamine A (curitative) is added and mixed for 3 minutes.

Step 20

The mixture is poured into the mould, making sure to fill each pocket created by the cable supports.

Step 21

Repeat step 19 while step 20 is being conducted and then repeat step 20. This is carried out until the mould is full. Note: It is important that the pour sequence is adhered to (Refer FIG. 6).

Step 22

When the mould is full, a naked flame is passed over the top of the mould to break any air bubbles.

Step 23

The oven is placed back over the mould and cured for 1 hour at 100 degrees centigrade.

Step 24

At this point the track can be removed from the mould but should be cured for another 3 hours.

I claim:

1. A belt construction for use in a moving track support system of a vehicle, said belt construction comprising first and second endless lengths formed at least partially by moulded synthetic resin, said first and second endless lengths being laterally spaced from one another and each said endless length including at least one reinforcing member in a single length arranged within the synthetic resin in a plurality of loops, each of said loops being arranged adjacent to one another, and a plurality of metal cleats extending transversely across said first and second endless lengths on inwardly facing surfaces of said endless lengths, said metal cleats being connected to said endless lengths and uniformly spaced along said inwardly facing surfaces of the endless lengths of integrally moulded synthetic resin, each of said cleats including drive formations located intermediate transverse ends of said cleats adapted to cooperate with drive means of the track support system.

2. A belt construction according to claim 1, wherein said drive formations are located centrally between said endless lengths.

3. A belt construction according to claim 1 or claim 2, wherein transversely spaced retainer members are provided, each said retainer member extending inwardly from said metal cleats to locate outwardly of support rollers of the track support system.

4. A belt construction according to claim 1, wherein each said metal cleat includes at least one reinforcing member support element extending into the moulded synthetic resin at least in the first and second endless lengths, the or each said support element including a plurality of adjacent openings through which said reinforcing member or members pass(es).

5. A belt construction according to claim 4, wherein said first and second endless lengths are integrally moulded from said synthetic resin with transversely extending outwardly directed traction bars of said synthetic resin material.

6. A belt construction according to claim 1, wherein said first and second lengths are separately moulded with bores moulded into said lengths between adjacent said loops of the reinforcing members, said bores being located to enable bolts to secure said metal cleats to said endless lengths.

7. A belt construction according to claim 6 wherein said metal cleats include transversely extending traction bars on outwardly directed faces of said endless lengths.

8. A belt construction according to claim 7 including transversely spaced retainer members each of which extends inwardly from said metal cleats to locate outwardly of support rollers of the track support system, said bolts securing said metal cleats to said endless lengths said bolts also securing said traction bars and said retainer members to said endless lengths.

9. A tea harvesting machine according to claim 8 including a main frame extending upwardly from each of said track supports.

10. A belt construction according to claim 1, wherein said drive formations comprise inwardly facing convex curved surfaces adapted to cooperate with a sprocket wheel of the drive means of said track support system.

11. A belt construction according to claim 1, wherein each of said first and second lengths of moulded synthetic resin includes only one length of said reinforcing member with first and last said loops being formed by joining a respective free end of said reinforcing member to the reinforcing member along its length.

12. A belt construction according to claim 1, wherein the or each said reinforcing member is steel wire cable.

13. A belt construction according to claim 1, wherein said synthetic resin is polyurethane.

14. A tea harvesting machine comprising a pair of laterally spaced, but aligned, moving track support means, each of said track support means comprising a support base carrying an endless track configuration including a belt construction according to claim 2.

15. A tea harvesting machine according to claim 14 including a plurality of roller support elements carried on said support base, said belt construction being carried on said roller support elements.

16. A method of producing an endless belt construction, said method comprising providing a mould defining an endless belt shape, locating a plurality of members within said mould at spaced locations, said members forming part of said belt construction, each of said members defining location means for retaining an elongated reinforcing member in a desired position, locating an elongated reinforcing member within said mould in an arrangement of a plurality of loops held by said location means, said loops being adjacent to but spaced from one another, and introducing a mouldable synthetic resin into said mould to form said belt construction.

17. A method according to claim 16 wherein said members including said location means also include preformed bores extending transversely to mould surfaces adapted to form peripheral inner and outer surfaces of said belt construction, said preformed bores being adapted to receive securing bolts in said belt construction.

* * * * *